(12) United States Patent
Nakao et al.

(10) Patent No.: US 11,144,543 B2
(45) Date of Patent: Oct. 12, 2021

(54) COMPUTER-READABLE RECORDING MEDIUM, ESTIMATION METHOD AND ESTIMATION DEVICE

(71) Applicant: FUJITSU LIMITED, Kanagawa (JP)

(72) Inventors: Yuri Nakao, Kawasaki (JP); Kotaro Ohori, Sumida (JP); Hiroaki Yoshida, Isehara (JP); Takuya Ohwa, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 157 days.

(21) Appl. No.: 16/199,457

(22) Filed: Nov. 26, 2018

(65) Prior Publication Data

US 2019/0163676 A1    May 30, 2019

(30) Foreign Application Priority Data

Nov. 30, 2017  (JP) .............................. JP2017-230606

(51) Int. Cl.
  *G06F 16/245* (2019.01)
  *G06Q 30/02* (2012.01)
  *G06F 40/40* (2020.01)

(52) U.S. Cl.
  CPC ............ *G06F 16/245* (2019.01); *G06F 40/40* (2020.01); *G06Q 30/0203* (2013.01)

(58) Field of Classification Search
  CPC .. G06F 16/245; G06F 40/40; G06F 16/24575; G06F 16/2425; G06Q 30/0203
  See application file for complete search history.

(56) References Cited

U.S. PATENT DOCUMENTS

| | | | |
|---|---|---|---|
| 2007/0288439 A1 | 12/2007 | Rappaport et al. | |
| 2012/0271884 A1* | 10/2012 | Holmes | G06Q 30/02 709/204 |
| 2016/0210646 A1* | 7/2016 | Edmonds | G06Q 30/0203 |
| 2019/0114653 A1* | 4/2019 | Krishnan | G06Q 30/0217 |

FOREIGN PATENT DOCUMENTS

| | | |
|---|---|---|
| JP | 2006-330858 | 12/2006 |
| JP | 2009-540475 | 11/2009 |

* cited by examiner

*Primary Examiner* — Cam Y T Truong
(74) *Attorney, Agent, or Firm* — Fujitsu Patent Center

(57) ABSTRACT

A search device, for each of a plurality of inquiries including a plurality of options, based on a log of answers of a respondent in the past, specifies a matching option corresponding to a trend of answers of the respondent from the plurality of options to be represented to the respondent. The search device, when an answer to the plurality of options is included in the matching option, determines that it is a preference-reached mode that is a mode where the estimating a preference of the user converges. The search device transmits, to the respondent, an inquiry including options, contents of the options included in the inquiry being changed depend on whether it is determined to be a preference-reached mode in the determining.

6 Claims, 18 Drawing Sheets

FIG.3

| AREA NAME | TRANSPORTATION CONVENIENCE | SHOPPING | SCHOOL | TIES WIT NEIGHBORS | CLINIC | SAFETY |
|---|---|---|---|---|---|---|
| AREA A | X SERVICES ON ONE WAY FROM XX STATION/DAY | LARGE SUPERMARKETS IN AREA | X-MINUTES WALK TO NEAREST PRIMARY SCHOOL | EVENT PARTICIPATION PERCENTAGE X% | NUMBER OF PRIMARY CARE CLINICS X | NUMBER OF PETTY CRIMES X/YEAR |
| ... | ... | ... | ... | ... | ... | ... |

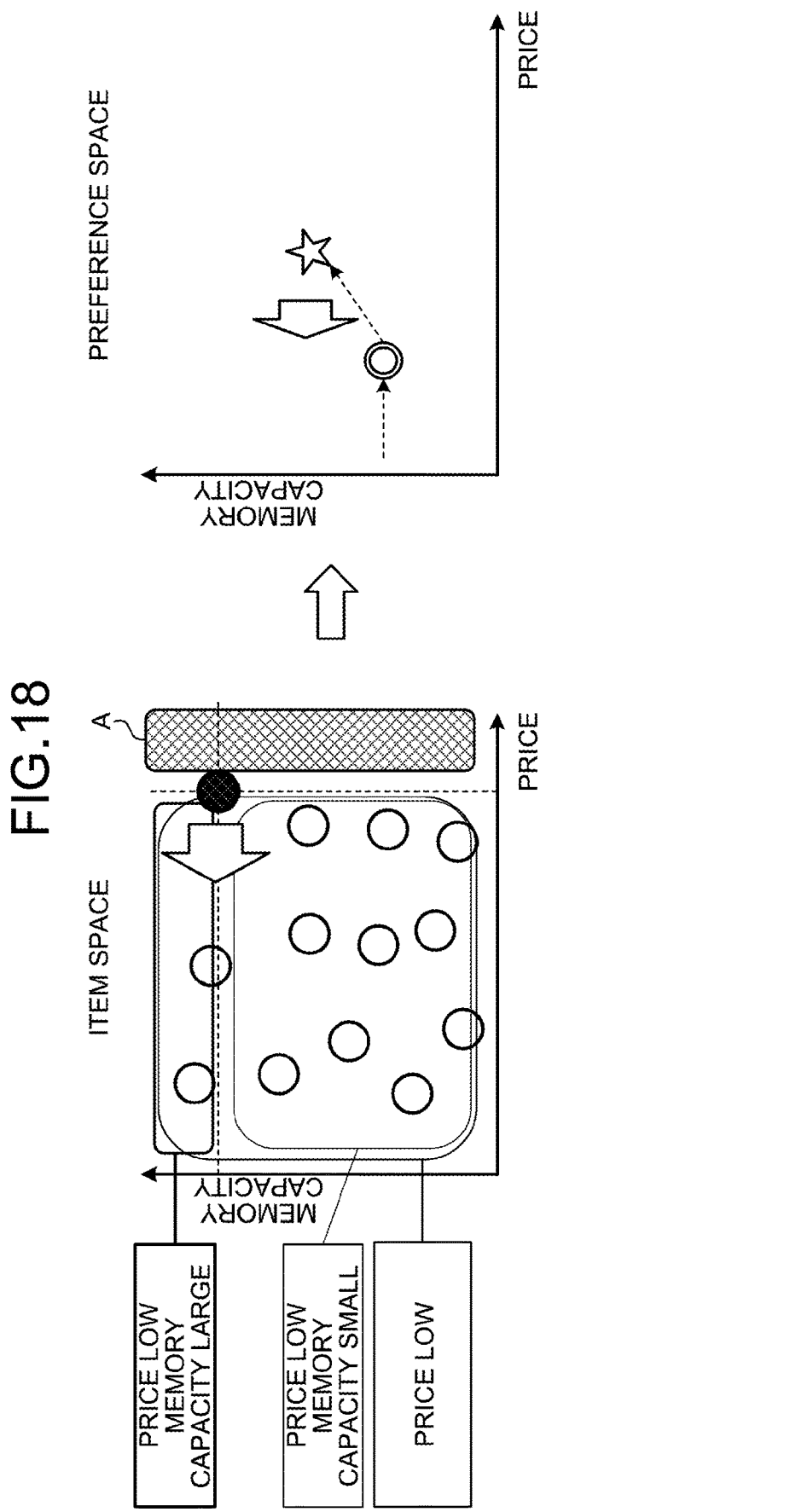

COMPUTER-READABLE RECORDING MEDIUM, ESTIMATION METHOD AND ESTIMATION DEVICE

CROSS-REFERENCE TO RELATED APPLICATIONS

This application is based upon and claims the benefit of priority of the prior Japanese Patent Application No. 2017-230606, filed on Nov. 30, 2017, the entire contents of which are incorporated herein by reference.

FIELD

The embodiments discussed herein are related to a computer-readable recording medium, an estimation method and an estimation device.

BACKGROUND

A technology to represent multiple options or items to a user and, based on an answer of choice of the user, search for a preference of the user is known. Furthermore, a technology to, in a system that searches for an item that is specified by a group of attribute from an item space, choose a group of attribute to represent an accurate number of items to the user is known.
Japanese National Publication of International Patent Application No. 2009-540475
Japanese Laid-open Patent Publication No. 2006-330858

For example, it can be assumed that, using the above-described technology, multiple questions are asked of a would-be relocator and options are repeatedly represented to estimate a preference of the would-be relocator including important items and favor and matching between the would-be relocator and a local government is implemented.

In the aforementioned technology, however, a "convincing process" to calculate further additional options is executed although a true preference that the user wants has been reached and thus an option deviating from the true preference is represented after the true preference is reached and accordingly accuracy of estimating a preference may deteriorate. In other words, the user thinks that there is a better option and repeats answering questions, which rather may promote representation of bad options differing from what the user wants.

FIG. 17 is a diagram illustrating the convincing process. FIG. 17 illustrates an exemplary system that, using a two-dimensional item space with "transportation" and "safety" serving as attributes, displays relocation sites corresponding to a preference of the user to allow the user to choose a relocation site. As illustrated in FIG. 17, even when the user has reached a true preference that the user wants after repeating searching multiple times, the user further executes the "convincing process" to calculate additional options to check that the user has reached the true preference and convince himself/herself. For this reason, when the user repeats the searching multiple times and continues the convincing process after reaching the true preference that the user wants, relocation sites that the system displays deviate from the true preference and thus the user eventually separates from the system.

FIG. 18 is a diagram illustrating deterioration in accuracy of estimation due to the convincing process. FIG. 18 illustrates an exemplary system that displays corresponding products according to a preference of the user to allow the user to choose a product, using a two-dimensional item space with "memory capacity" and "price" serving as attributes. The black circle represented in FIG. 18 denotes the current preference of the user and white circles denote items.

As illustrated in FIG. 18, even when there is no item in Area A that is an area of items more suitable to a user who has reached a true preference than the current item (black circle) is, the user continues the convincing process. In the above-described technology, a direction (the direction denoted by the arrow in FIG. 18) in which another item is likely to be for the user who has reached the convincing process is searched and items are represented. As a result, the user who has reached the true preference is directed to a direction differing from that of the true preference and deviates from the true preference and thus items that are represented are distant from the preference of the user and this causes deterioration in accuracy of estimating a preference.

SUMMARY

According to an aspect of embodiments, a non-transitory computer-readable recording medium stores therein a program that causes a computer to execute a process. The process includes for each of a plurality of inquiries including a plurality of options, based on a log of answers of a respondent in the past, specifying a matching option corresponding to a trend of answers of the respondent from the plurality of options to be represented to the respondent; when an answer to the plurality of options is included in the matching option, determining that it is a preference-reached mode that is a mode where the estimating a preference of the user converges; and transmitting, to the respondent, an inquiry including options, contents of the options included in the inquiry being changed depend on whether it is determined to be a preference-reached mode in the determining.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating exemplary information that is stored in a local government information DB;

FIG. 18 is a diagram illustrating deterioration in accuracy of estimation due to the convincing process.

DESCRIPTION OF EMBODIMENTS

Preferred embodiments will be explained with reference to accompanying drawings. The embodiments do not limit the invention. The embodiments may be combined as long as no inconsistency is caused.

[a] First Embodiment

Overall Configuration

Figure 1:
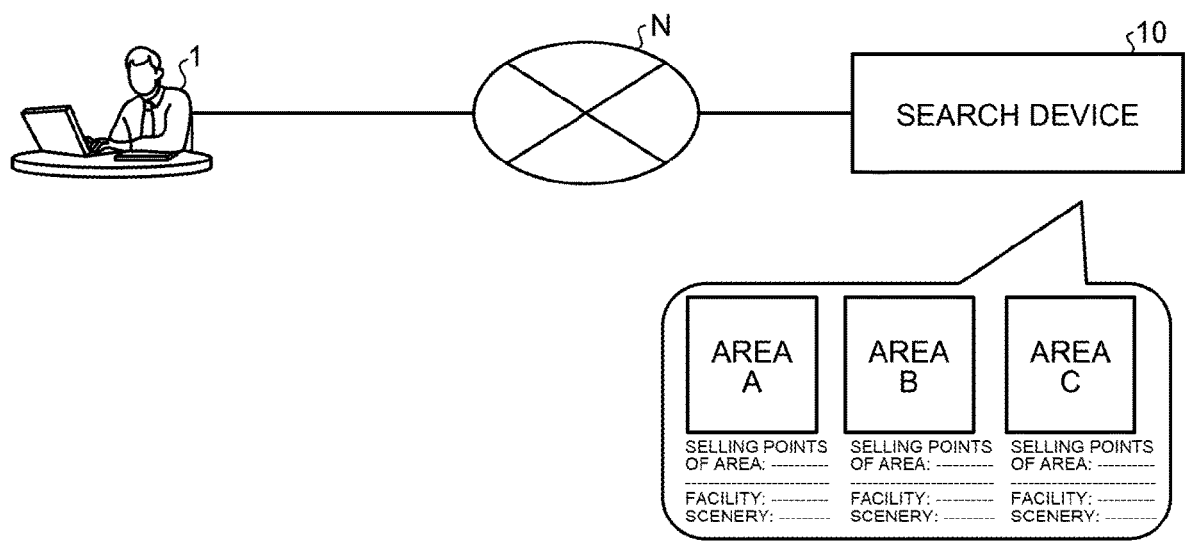
FIG. 1 is a diagram illustrating an exemplary overall configuration of a system according to a first embodiment.

FIG. 1 is a diagram illustrating an exemplary overall configuration of a system according to the embodiment. As illustrated in FIG. 1, the system is a relocator matching system in which a user terminal 1 and a search device 10 are connected with each other via a network N. Various types of network, such as the Internet, can be used as the network N regardless whether the network is wired or wireless.

In the system, the user terminal 1 that a would-be relocator uses accesses the search device 100 in order to search for a relocation area. The search device 10 causes the user terminal 1 to display questions multiple times, estimates a preference including important items and preference of the would-be relocator (also referred to as user below), and display a local government that matches the preference on the user terminal 1. The present system is a system that implements matching between a would-be relocator and a local government that serves as a relocation site.

The relocator matching system will be exemplified to describe the first embodiment; however, embodiments are not limited thereto. Any system may be used as long as, for example, the system estimates a preference of a user according to answers to inquiries to the user.

The user terminal 1 is a computer device that the would-be relocator uses and is, for example, a personal computer, a mobile phone, a tablet terminal or a smartphone. The would-be relocator is an exemplary respondent.

The search device 10 is an exemplary server device that executes the above-described relocator matching. The search device 10 stores various logs including information on local governments, such as "Area A, Area B and Area C", a log of searches by the would-be relocator, and information on estimation of a preference that the would-be relocator requests from a relocation site. The search device 10 represents inquiries (questions) to the would-be relocator multiple times, estimates a preference of the would-be relocator according to answers to the inquiries and represents a relocation site (local authority) that matches what the would-be relocator wants. In the first embodiment, the relocation site represented to the would-be relocator is also referred to as "item" below.

In general, when choosing an area to which a resident in an urban area relocates, what the resident wants in a relocation site has to be input to the system; however, it is not possible to take decrease in life convenience after relocation into consideration and thus it is not possible to express a true preference clearly. Thus, the search device 10 realizes a recommendation system that suggests an area appropriate to a would-be relocator to a local government based on the human psychology, determines whether the would-be relocator has reached a true preference of the would-be relocator that the would-be relocator requests subconsciously or unconsciously, and changes options to represent.

In such a system, the search device 10 estimates a preference of the would-be relocator based on answers (preference) to multiple inquiries each containing multiple options. Specifically, for each inquiry, based on a log of answers of the would-be relocator in the past, the search device 10 specifies a matching option (a provisional preference) corresponding to a trend of answers of the would-be relocator from multiple options that are represented. When an answer to the multiple options is contained in the matching option, the search device 10 then determines that it is a preference-reached mode that is a mode where estimation of a preference of the would-be relocator converges. When is it determined that it is the preference-reached mode, the search device 10 changes the represented options such that the represented options are different from those represented when it is not determined that it is the preference-reached mode. The preference-reached mode is an exemplary convincing process.

In other words, by taking the "convincing process" to perform searching for further additional options although a would-be relocator has reached a true preference, the search device 10 inhibits the would-be relocator having reached the convincing process from being directed to a direction deviating from the true preference.

For example, the would-be relocator having reached the true preference that the would-be relocator wants executes the convincing process and searches for an item that is similar to the represented item and is better than the represented item. In this case, the would-be relocator tends not to prefer an attribute group randomly but tends to continue preferring an attribute group similar to an attribute group that the would-be relocator prefers previously and executes specifying a preference for a while. Although areas with better transportation convenience are not represented anymore, the would-be relocator continues increasing transportation convenience, or adds another attribute, such as transportation convenience and shopping convenience, and continues searching.

On the other hand, a would-be relocator who has not reached a true preference that the would-be relocator wants is not satisfied with represented items but does not know items to compromises on and performs exploratory and haphazard specification of a preference with low consistency in preferred attribute groups. An attribute group refers to a group of attributes that the user inputs to specify a preference of relocation site and is, for example, "transportation high and safety high", "transportation low" or "transportation low and safety high".

As described above, whether a true preference is reached or not is determined according to whether an attribute group of the same trend is preferred regardless of the number of items. The mode where a true preference is reached is, for example, a mode where a direction that the user prefers is determined, a mode where estimation of a preference performed by the search device 10 converges, or a mode where choice of a relocation site performed by the search device 10 converges.

The search device 10 represents an option that matches a trend of choice of the would-be relocator (also referred to as "provisional preference" below) that is derived from the preference log of the would-be relocator as an "option for determining whether a true preference has been reached (determination option)". The search device 10 determines that the user who chooses the "option for determining whether a true preference has been reached" has reached the true preference and has reached the "convincing process" and inhibits the user from being directed to a direction deviating from the true preference. In this manner, the search device 10 is able to inhibit deterioration in accuracy of estimating a preference of the user.

Functional Configuration

Figure 2:
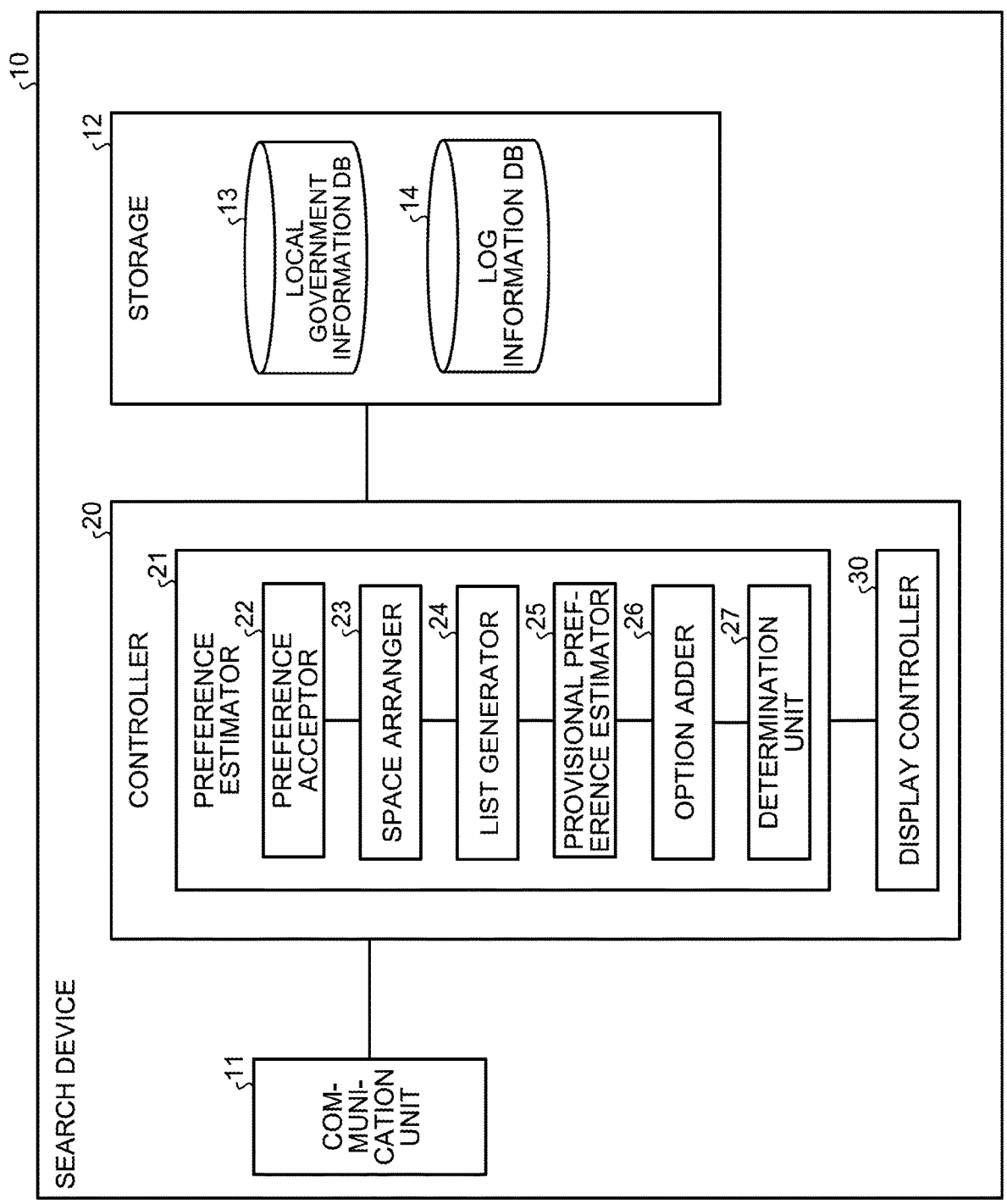
FIG. 2 is a functional block diagram illustrating a functional configuration of a search device according to the first embodiment.

FIG. 2 is a functional block diagram illustrating a functional configuration of the search device 10 according to the first embodiment. As illustrated in FIG. 2, the search device 10 includes a communication unit 11, a storage 12 and a controller 20. The communication unit 11 is a processor that controls communication with other devices, such as the user terminal 1, and is, for example, a communication interface. For example, the communication unit 11 establishes communication with the user terminal 1 by a web browser and realizes communication of information on the web browser.

The storage 12 is an exemplary storage device that stores programs and data and is, for example, a memory and a hard disk. The storage 12 stores a local government information DB 13 and a log information DB 14. The storage 12 is able to store various types of information on the user who is a would-be relocator, such as the name and the progress of estimation of preference, in a storage other than the aforementioned DBs.

The local government information DB 13 is a database in which the search device 10 stores information on local governments that may match the user. FIG. 3 is a diagram illustrating exemplary information that is stored in the local government information DB 13. As illustrated in FIG. 3, the local government information DB 13 stores "area name, transportation convenience, shopping, school, ties with neighbors, hospital, and safety" in association with one another.

An "area name" stored in the local government information DB 13 is the name of an area of a local government serving as a relocation site. The aforementioned "transportation convenience, shopping, school, ties with neighbors, hospital, and safety" are selling points of the area and the number and content of the items listed herein can be changed optionally. "Transportation convenience" is information about convenience of transportation in the area, "shopping" is information on supermarkets, etc., in the area, "school" is information on schools set in the area. "Ties with neighbors" is information on ties with neighbors in the area, "hospital" is information on hospitals in the area, and "safety" is information on the number of crimes in the area, etc.

In the case illustrated in FIG. 3, in "AREA A", there are X train services from XX station on one-way per day, there is a large supermarket in the area, and it takes X minutes to the nearest primary school on foot. FIG. 3 further indicates that, in "AREA A", the percentage of participation in events is X %, the number of primary care clinics is X, and X petty crimes occur per year. The local government information DB 13 may store each item in a specific numeric value (for example, score).

The log information DB 14 is a database that stores various logs that occur in relocator matching. Specifically, the log information DB 14 stores inquiries from the search device 10, responses to the inquiries, attribute groups that the user inputs, the log of choices made by the user (preference log), etc.

The controller 20 is a processor that controls the entire search device 10 and is, for example, a processor. The controller 20 includes a preference estimator 21 and a display controller 30. The preference estimator 21 and the display controller 30 are exemplary electronic circuits of the processor or exemplary processes that are executed by the processor.

The preference estimator 21 is a processor that makes multiple inquiries to the user, acquires answers of the user, and estimates a preference of the user from a log of answers. The preference estimator 21 includes a preference acceptor 22, a space arranger 23, a list generator 24, a provisional preference estimator 25, an option adder 26 and a determination unit 27. The provisional preference estimator 25 is an example of a specifying unit and a first search unit and the option adder 26 and the determination unit 27 are an example of a determination unit and a representation controller.

The preference acceptor 22 is a processor that accepts a preference of the user. Specifically, on a web screen that is displayed by the display controller 30, which will be described below, the preference acceptor 22 accepts a preference of the user or accepts a preference of the user by choice from a list that is displayed by each processor, which will be described below. The preference acceptor 22 accepts "transportation high" when importance is placed on an attribute "transportation" or accepts "transportation low" when importance is not placed on the attribute "transportation". The accepted item may be a specific numeric value or "plus (+)" or "minus (−)" and is changeable optionally in conformity with the system.

The space arranger 23 is a processor that positions the user in a preference space and specifies represented items in an item space based on the preference of the user. Specifically, for the first preference ($T=t-1=1-1=0$), the space arranger 23 classifies the user into a segment by a known method and executes positioning in the preference space based on the result of classification and positioning in the item space. For the second and following preferences ($T=t-1$ and $t \neq 1$), the space arranger 23 executes positioning in the preference space and positioning in the item space based on the preference of the user that is accepted by the preference acceptor 22.

Figure 4:
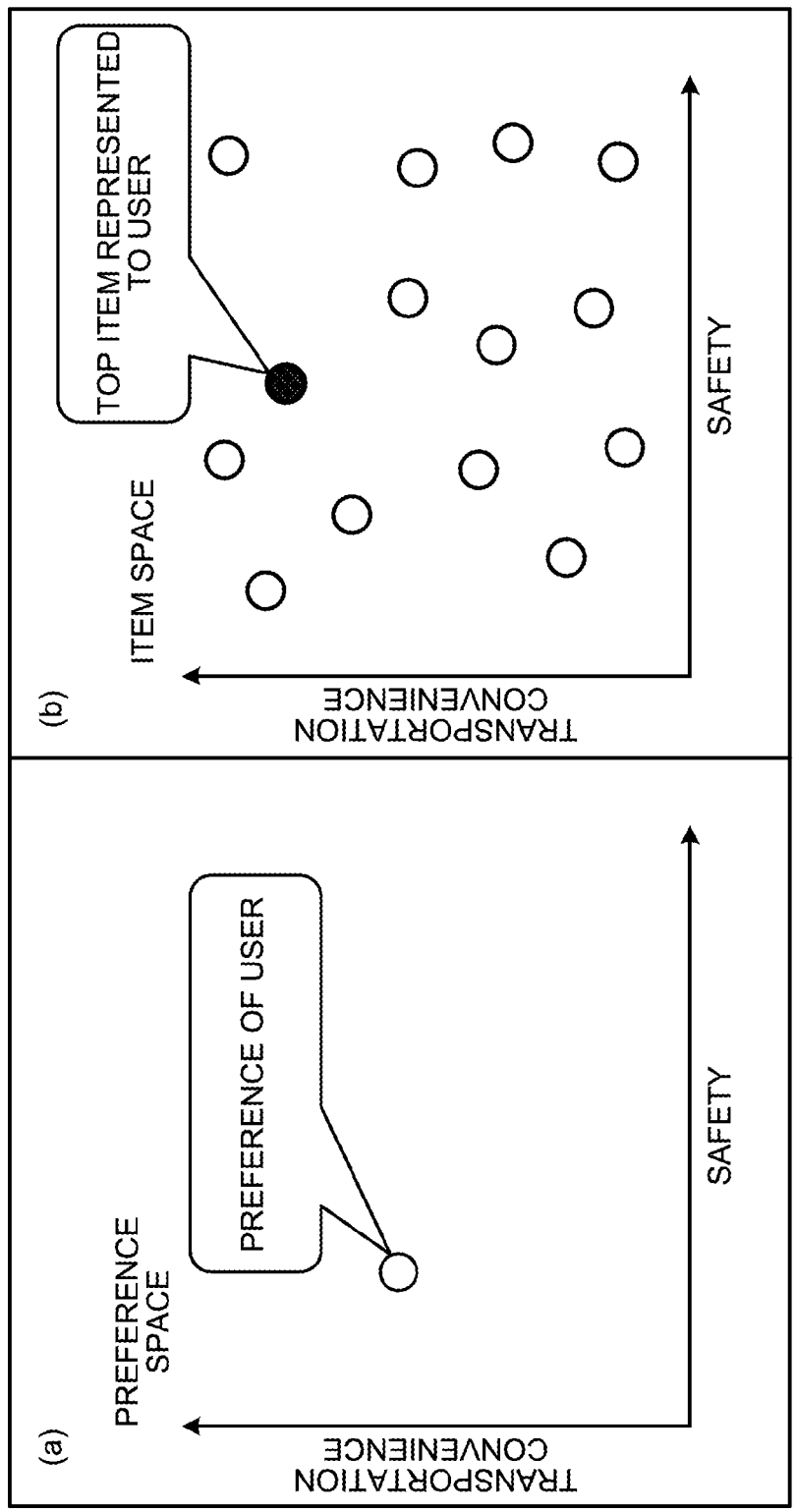
FIG. 4 is a diagram illustrating association with a preference space and association with an item space.

FIG. 4 is a diagram illustrating association with the preference space and association with the item space. In the embodiment, in order to simplify descriptions, a two-dimensional space using "transportation convenience and safety" as indices of preference will be described. In other words, the preference of the user is determined by "transportation convenience" and "safety" and the user executes searching for a relocation site that matches conditions that the user wants by increasing importance of transportation convenience, increasing importance of both transportation convenience and safety, lowering only importance of transportation convenience after increasing importance of both transportation convenience and safety, etc.

As illustrated in (a) in FIG. 4, the space arranger 23 sets, in the two-dimensional preference space, the current preference of the user in a position corresponding to "transportation convenience and safety" that are chosen by the user. For example, the space arranger 23 sets the current preference of the user in a position corresponding to respective scores of "transportation convenience and safety" that are set by the user.

As illustrated in (b) in FIG. 4, after positioning the preference of the user in the preference space as illustrated in (a) in FIG. 4, the space arranger 23 positions the top item among items represented to the user at that time in the item space. For example, the space arranger 23 groups "transportation convenience and safety" that are stored in the local government information DB 13 based on conditions and numeric values and specifies, in the item space, a position corresponding to each of the conditions "transportation convenience and safety" that are set by the user.

The space arranger 23 then displays a list of candidates for a relocation site that the user searches for as a list. Specifically, the space arranger 23 sets the item corresponding to the specified position as the top item and generates a list of items that are set according to the descending order in which each of the items contained in the concentric circle of the top item in the item space is close to the top item. The space arranger 23 then displays, to the user, the generated item list as candidates for a relocation site that the user searches for.

The list generator 24 is a processor that generates a list of attribute groups of preference of the user. Specifically, when an instruction to update the item list is received from the user, the list generator 24 generates a list indicating how many items correspond to each attribute group that can be chosen by the user as the next preference.

For example, the list generator 24 comprehensively searches the magnitudes of indices (attributes) of the represented items and other items, filters combinations of magnitudes of the indices by an A priori algorithm, and generates a list of preference attribute groups on which a top-N list is listed. More specifically, with respect to each combination of magnitudes of indices, the list generator 24 counts how many items are relatively to the current top item. Subsequently, the list generator 24 excludes attribute groups each accounting for less than a given ratio to the number of all the items. The list generator 24 then lists the remaining attribute groups and ranks the attribute groups. In order to reduce the load of recognition on the user, the list generator 24 ranks the attribute groups such that, the smaller the number of items is, the higher the item group is ranked.

Figure 5:
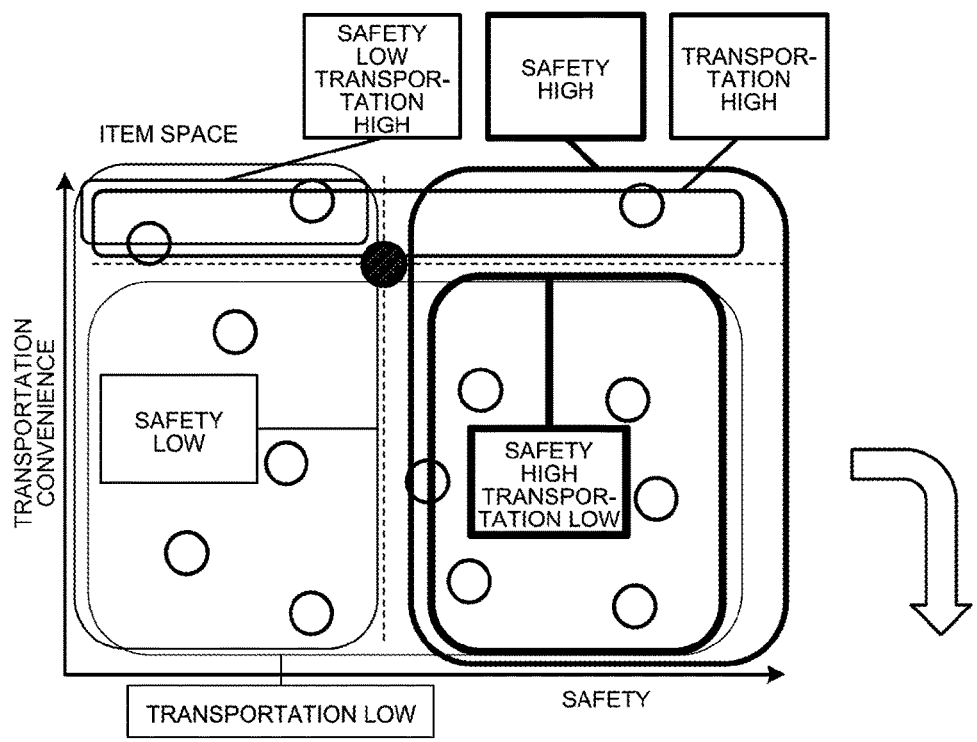
FIG. 5 is a diagram illustrating exemplary specific generation of a list of preference attribute groups.

A specific example will be described using FIG. 5. FIG. 5 is a diagram illustrating specific exemplary generation of a preference attribute group list. In the item space illustrated in FIG. 5, the position of the black circle is the position of the current preference of the user. Based on the current preference position, the list generator 24 counts "6" that is the number of items contained in the "safety is low" area, "2" that is the number of items contained in the "safety is low and transportation convenience is high" area, and "4" that is the number of items contained in the "safety is low and transportation convenience is low" area. Similarly, the list generator 24 counts "7" that is the number of items contained in the "safety is high" area, "6" that is the number of items contained in the "safety is high and transportation convenience is low" area, and "1" that is the number of items contained in the "safety is high and transportation convenience is high" area. Similarly, the list generator 24 counts "3" that is the number of items contained in the "transportation convenience is high" area and "10" that is the number of items contained in the "transportation convenience is low" area. Note that FIG. 5 adopts simple representations like "transportation low" as "transportation convenience is low" and "safety high" as "safety is high".

The list generator 24 then calculates a ratio of the number of items in each area to the total number of items. For example, the list generator 24 calculates "6/14≈0.429" for the "safety is low" area, calculates "2/14≈0.143" for the "safety is low and transportation convenience is high" area, and calculates "4/14≈0.286" for the "safety is low and transportation convenience is low" area. Similarly, the list generator 24 calculates "7/14≈0.5" for the "safety is high" area, calculates "6/14≈0.429" for the "safety is high and transportation convenience is low" area, and calculates "1/14≈0.071" for the "safety is high and transportation convenience is high" area. Similarly, the list generator 24 calculates "3/14≈0.214" for the "transportation convenience is high" area and calculates "10/14≈0.714" for the "transportation convenience is low" area.

When a threshold that is changeable optionally is "0.4", the list generator 24 specifies four areas consisting of the "safety is low" area, the "safety is high" area, the "safety is high and transportation convenience is low" area, and the "transportation convenience is low" area as areas equal to or higher than the threshold. The list generator 24 then generates a preference attribute group list in which the four areas are arranged according to the ascending order of the numbers of items in the following order: "safety is low", "safety is high and transportation convenience is low", "safety is high" and "transportation convenience is low", and outputs the list to the provisional preference estimator 25, etc.

The provisional preference estimator 25 is a processor that estimates a "provisional preference" representing a trend of choice of indices made by the user based on the preference log of the user. Specifically, the provisional preference estimator 25 estimates a provisional preference for the second or following choice of preference made by the user or for a choice of preference for a given number of time and, for the first choice of preference, displays the preference attribute group list that is generated by the list generator 24 to the user.

Figure 6:
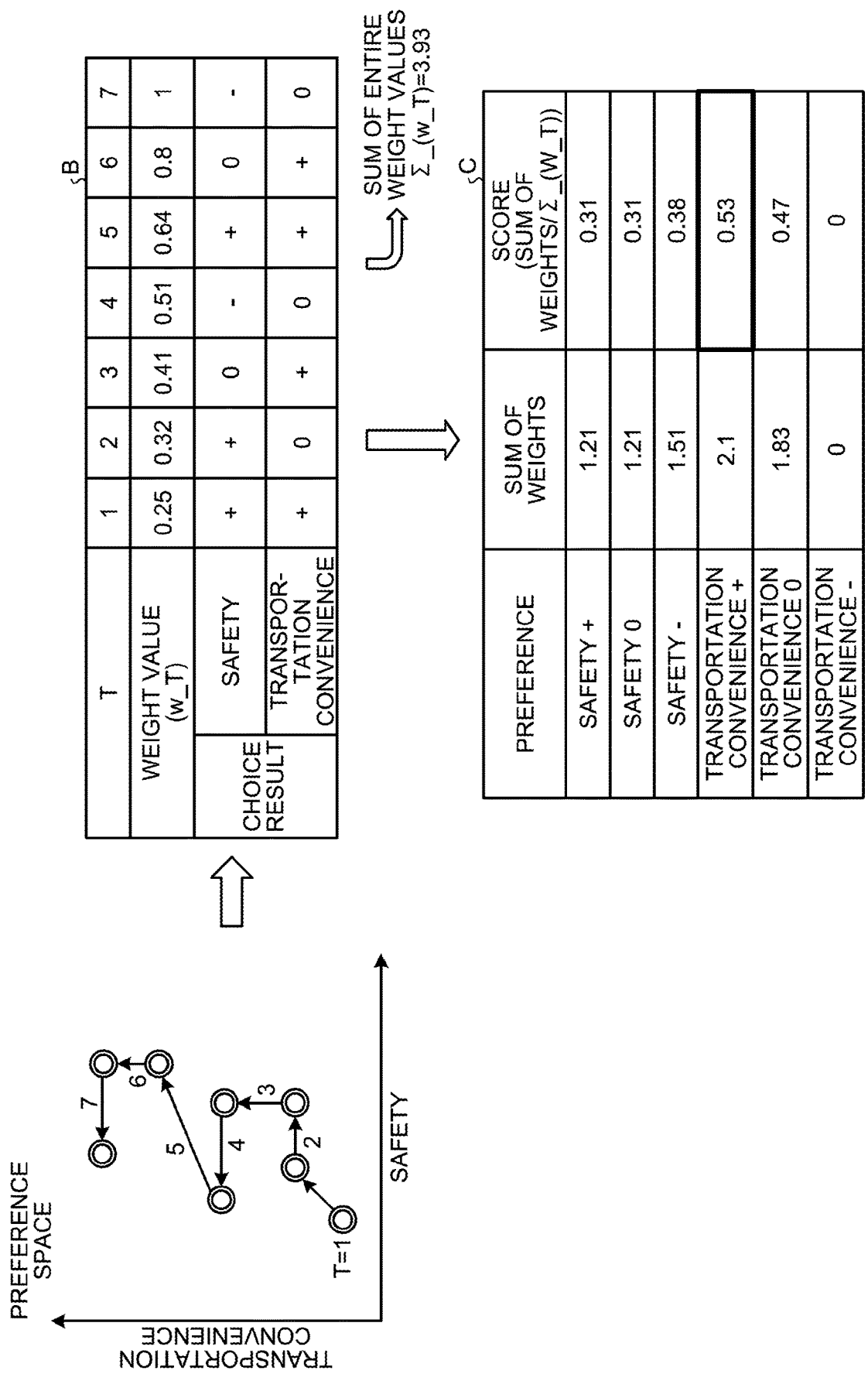
FIG. 6 is a diagram illustrating a specific example of estimating a provisional preference.

For example, the provisional preference estimator 25 applies larger weights to newer selection results from the preference log of the user and quantifies the trend of results of choices of the user. The provisional preference estimator 25 determines an attribute group whose corresponding numeric value is equal to or larger than a given value as a "provisional preference". A specific example will be described using FIG. 6. FIG. 6 is a diagram illustrating specific exemplary estimation of a provisional trend. FIG. 6 represents an example where a provisional trend is estimated in a state where choosing a preference has been already carried out seven times. A case where the importance of an attribute, such as safety, is increased from the previous one is represented as "+ (plus)" and a case where the importance is decreased is represented as "− (minus)", and a case where the importance is not changed is represented as "0".

First of all, in a case where choosing a preferences has been carried out seven times, the provisional preference estimator 25 applies a weight value (w_T) to each of the first (T=1) to seventh (T=7) preferences to increase the new preference (see (B) in FIG. 6). For example, as illustrated in FIG. 6, the provisional preference estimator 25 applies a weight value "0.25" to the first preference "safety + and transportation convenience +", applies a weight value "0.32" to the second preference "safety + and transportation convenience 0", and applies a weight value "0.41" to the third preference "safety 0 and transportation convenience +". Similarly, the provisional preference estimator 25 applies a weight value "0.51" to the fourth preference "safety − and transportation convenience 0", applies a weight value "0.64"

to the fifth preference "safety + and transportation convenience +", and applies a weight value "1" to the seventh preference "safety − and transportation convenience 0".

The provisional preference estimator 25 extracts each trend of preference from the list (B) in FIG. 6 and calculates a score to each trend (see (C) in FIG. 6). For example, the provisional preference estimator 25 calculates a sum "1.21" of the first, second and fifth weights applied for the execution of choosing the preference "safety +", calculates a sum "1.21" of the third and sixth weights applied for the execution of choosing the preference "safety 0", and calculates a sum "1.51" of the fourth and seventh weights applied for the execution of choosing the preference "safety −". In the same manner, the provisional preference estimator 25 calculates a sum "2.1" of the first, third, fifth and sixth weights applied for the execution of choosing the preference "transportation convenience +", calculates a sum "1.83" of the second, fourth and seventh weights applied for the execution of choosing the preference "transportation convenience 0", and calculates a sum "0" as choosing the reference "transportation convenience −" is not executed.

The provisional preference estimator 25 divides the weight of each preference by the sum of weights "3.93" to calculate a score of each preference. For example, the provisional preference estimator 25 calculates "2.1/3.93=0.53" as a score of the preference "transportation convenience +". The provisional preference estimator 25 estimates the preference "transportation convenience +" with a score equal to or larger than a threshold "0.5" that can be set optionally among the scores of the respective preferences as a provisional preference and adds the preference trend to the option adder 26. In other words, the provisional preference estimator 25 estimates that "the user wants to place much importance on transportation convenience".

The option adder 26 is a processor that adds items corresponding to the "provisional preference" that is estimated by the provisional preference estimator 25 to the preference attribute group list. Specifically, the option adder 26 determines whether there is an item in any direction that meets the "provisional preference", adds a "determination option" for determining whether the "provisional preference" is a "true preference" to the preference attribute group list and displays the preference attribute group list to the user.

Figure 7:
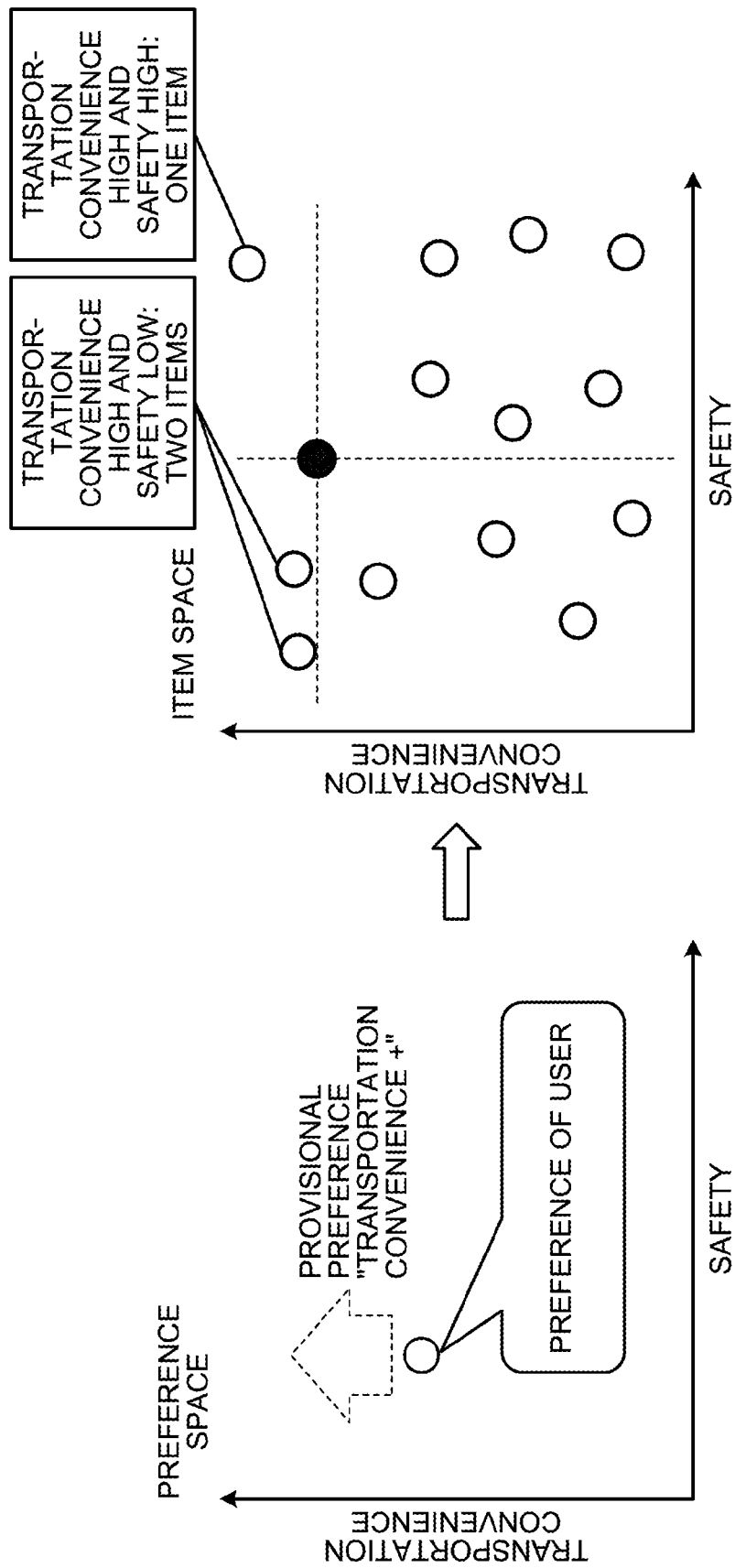
FIG. 7 is a diagram illustrating exemplary choice of an item that meets the provisional preference.

FIG. 7 is a diagram illustrating exemplary choice of an item that meets the provisional preference. As illustrated in the left view in FIG. 7, as it is estimated that the provisional preference is "transportation convenience +", the option adder 26 estimates that the preference (true preference) of the user in the preference space is in the "transportation convenience +" direction. Then, as illustrated in the right view in FIG. 7, the option adder 26 detects that, in the item space, in the directions in which the transportation convenience is plus (direction on which importance is placed), there are two items in the "safety low" direction and there is one item in the "safety high" direction. In other words, the option adder 26 specifies that there is one item in the "transportation convenience high and safety high" direction that is the direction of the provisional preference and there are two items in the "transportation convenience high and safety low" direction.

The option adder 26 adds all or the top-N attribute group with its corresponding items among the attribute groups satisfying the provisional preference as "determination options" to the preference attribute group list.

Figure 8:
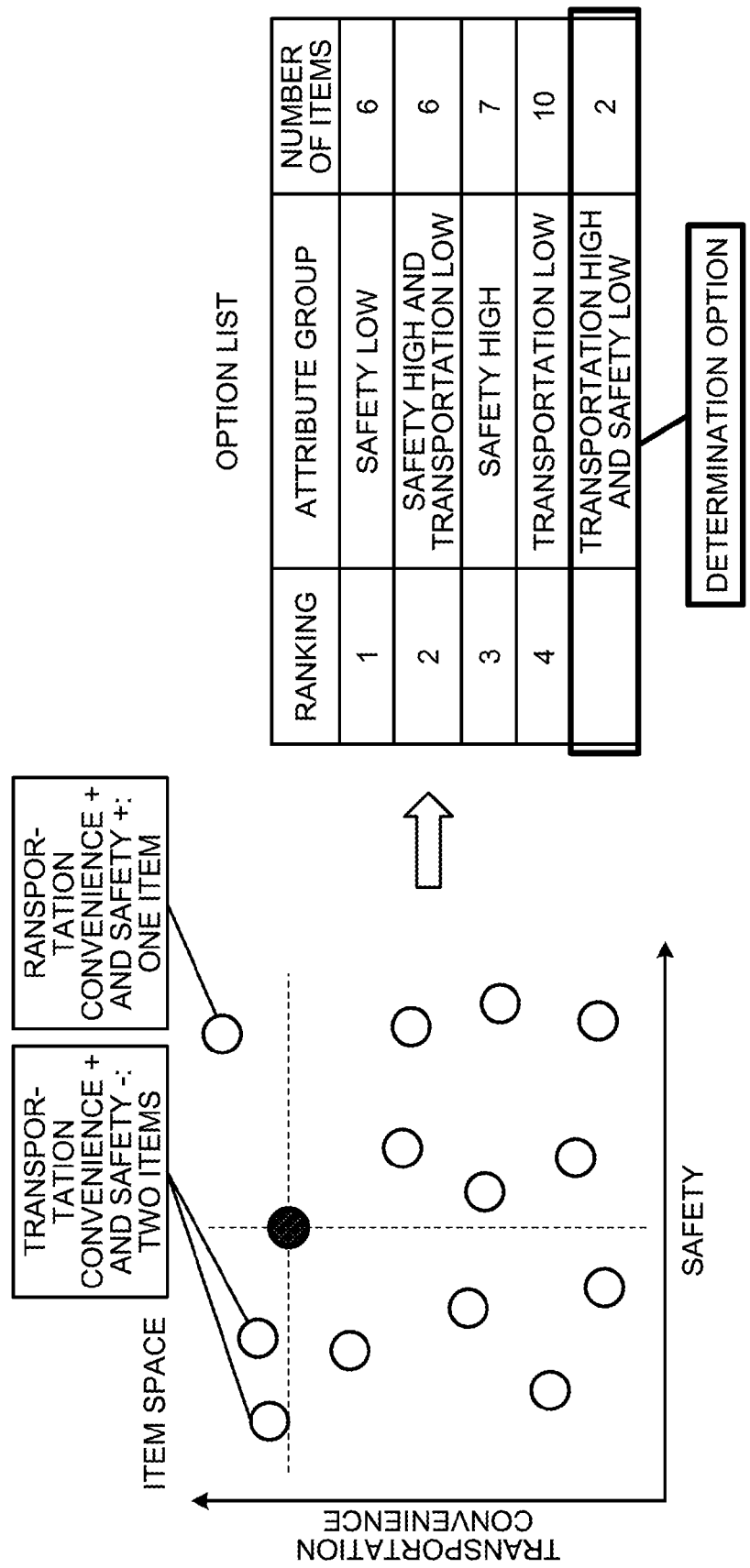
FIG. 8 is a diagram illustrating exemplary addition of a determination option in a case where there is an item that meets the provisional preference.

FIG. 8 is a diagram illustrating exemplary addition of a determination option with its corresponding items that meets the provisional preference. As illustrated in FIG. 8, when the top (N=1) attribute group with the largest number of items corresponding thereto is chosen from the attribute groups with its corresponding items that meet the provisional preference, the option adder 26 chooses "transportation convenience high and safety low" corresponding to two items. The option adder 26 adds "(transportation convenience high and safety low) and 2" as "attribute group and the number of items" to the preference attribute group list as a "determination option".

Figure 9:
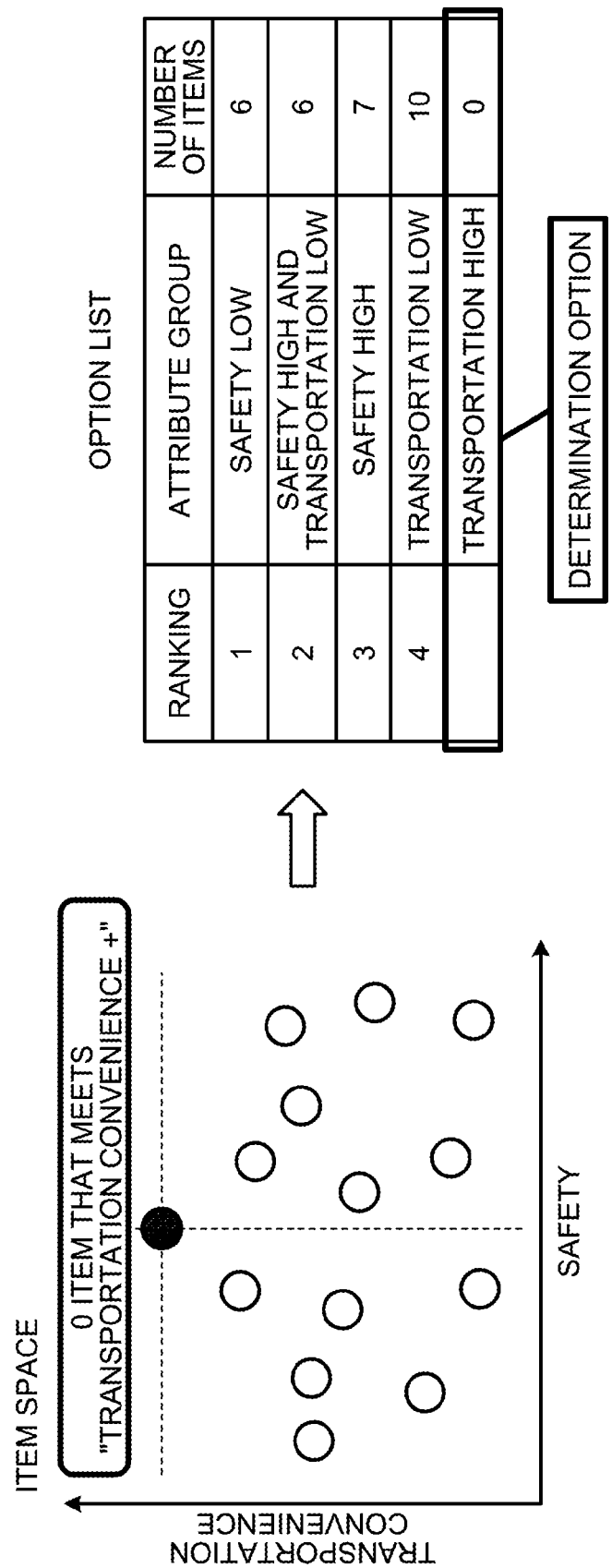
FIG. 9 is a diagram illustrating exemplary addition of a determination option in a case where there is no item that meets the provisional preference.

When there is no item in the direction of the provisional preference, information "there is 0 item" is added to the preference attribute group list. FIG. 9 is a diagram illustrating exemplary addition of a determination option in a case where there is no item that meets the provisional preference. As illustrated in FIG. 9, when there is no item in the "transportation convenience +" direction that is the provisional preference, the option adder 26 adds "transportation high and 0" serving as "attribute group and the number of items" to the preference attribute group list formally as a "determination option".

The determination unit 27 is a processor that determines whether the user has reached a true preference. Specifically, when it is determined that the user has reached a true preference, the determination unit 27 represents an attribute group that is a "true preference option" for leading the user not to execute the convincing process to the user. When the true preference option is chosen, the determination unit 27 displays a message that suggests ending the process to the user and, when the preference option is not chosen, displays a message indicating that there is no attribute group that changes the preference of the user better. On the other hand, when it is determined that the user has not reached a true preference, the determination unit 27 requests each processor, such as the space arranger 23 described above, to execute each process.

For example, when the user chooses a "determination option" in the preference attribute group list that is displayed to the user, the determination unit 27 determines that the user has reached a true preference. The determination unit 27 adds the "true preference option" to the preference attribute group list that is represented to the user regardless whether there is an item. The determination unit 27 adds the "true preference option" to the preference attribute group list even when there is no corresponding item in the true preference direction.

Figure 10:
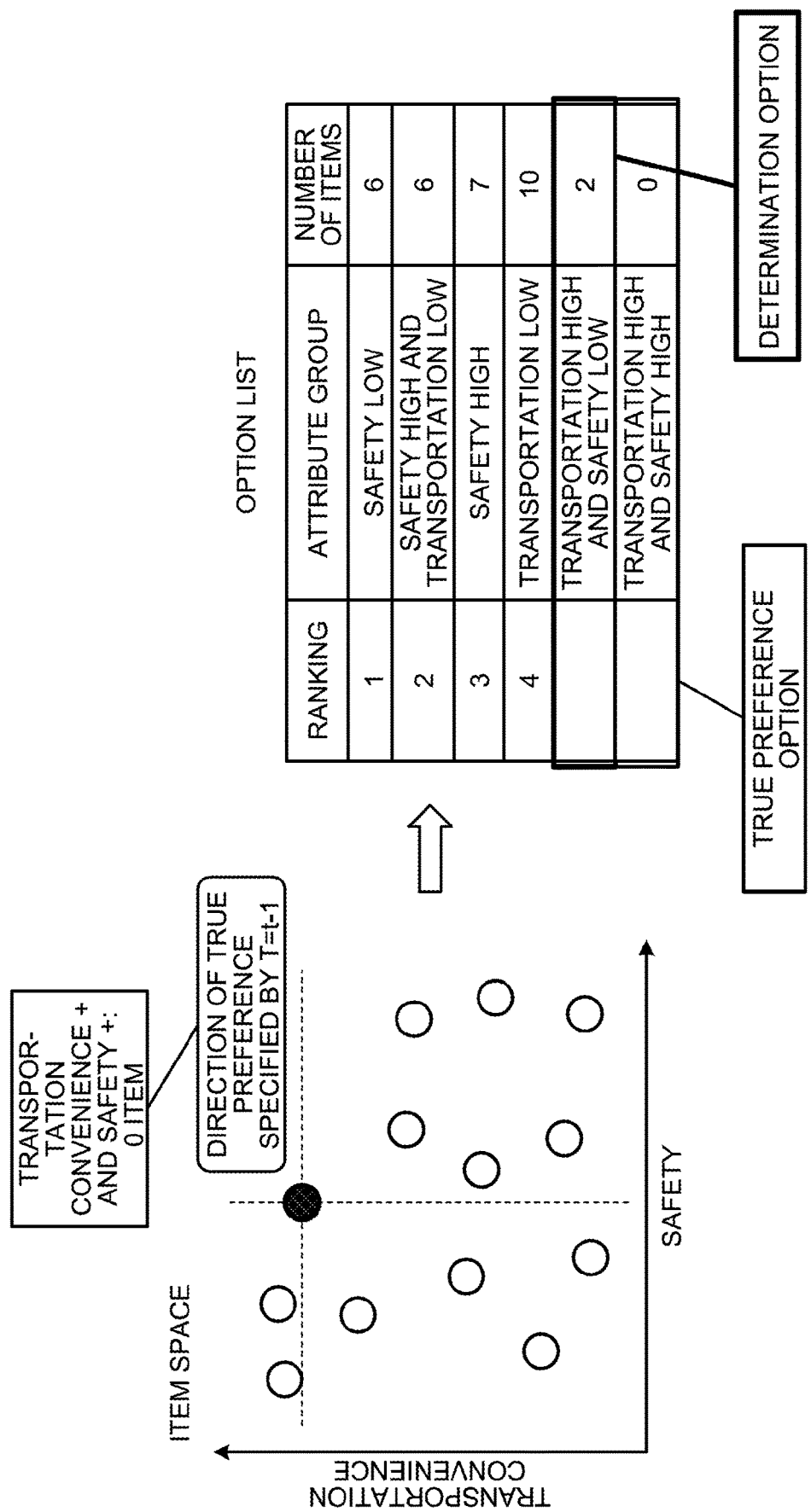
FIG. 10 is a diagram illustrating exemplary addition of an option of a true preference.

FIG. 10 is a diagram illustrating exemplary addition of an option of true preference. As illustrated in FIG. 10, when "transportation convenience high and safety low" serving as a "determination option" is chosen from the preference attribute group list that is represented to the user, the determination unit 27 determines that estimation of the provisional preference is correct and determines the provisional preference "transportation convenience +" as a "true preference". The determination unit 27 then adds the attribute group "transportation convenience high and safety high" and the number of items (0) that are not displayed previously in the direction of a provisional preference (true preference) that is specified at the previous timing (T=0) to the preference attribute group list as a "true preference option". FIG. 10 exemplifies the case where the number of items is 0. On the other hand, in the above-described example (in FIG. 7, or the like), the number of items is 1.

Figure 11:
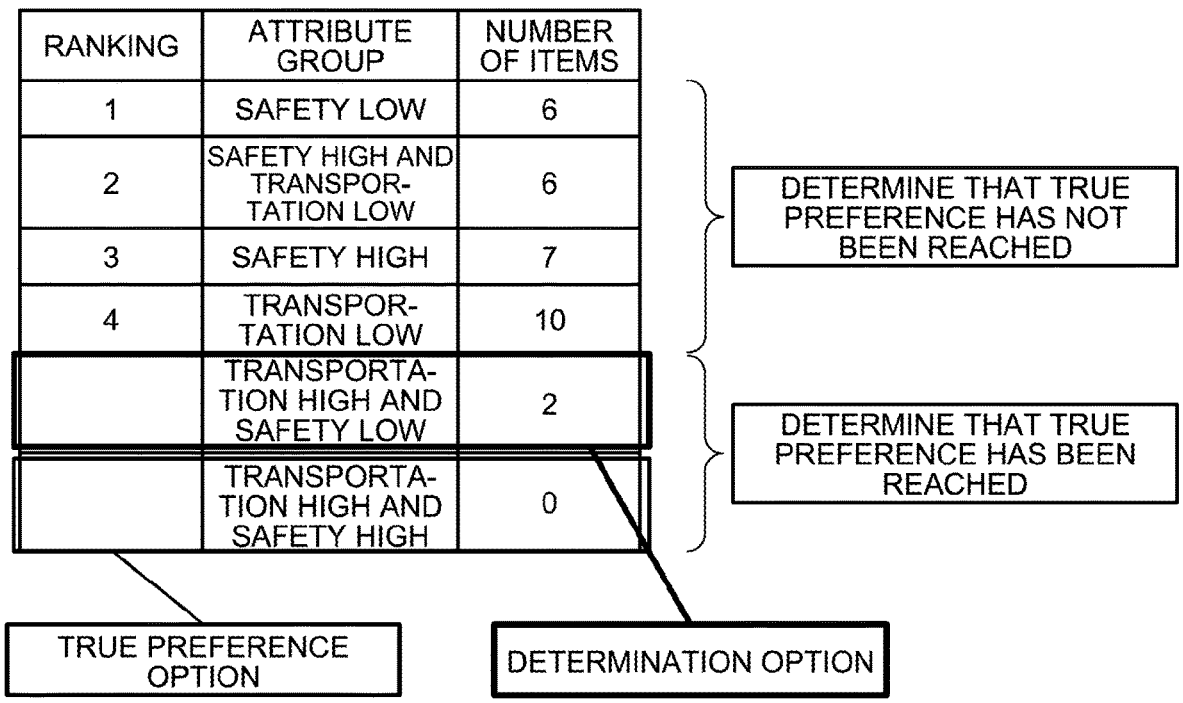
FIG. 11 is a diagram illustrating exemplary determination on whether a true preference has been reached.

Thereafter, when the determination option or the true preference option is chosen by the user, the determination unit 27 determines that the user has reached the true preference and, when an option other than the determination option and the true preference option is chosen, determines that the user has not reached the true preference. FIG. 11 is a diagram illustrating exemplary determination on whether the true preference has been reached. As illustrated in FIG. 11, the determination unit 27 displays, as the preference attribute list, "transportation high and safety low" serving as the determination option and "transportation convenience high and safety high" serving as the true preference option in addition to "safety low", "safety high and transportation low", "safety high" and "transportation low".

When "transportation high and safety low" serving as the determination option or "transportation convenience high and safety high" serving as the true preference option is chosen by the user, the determination unit 27 determines that the user has reached the true preference. On the other hand, when any one of "safety low", "safety high and transportation low", "safety high" and "transportation low" is chosen, the determination unit 27 determines that the user has not reached the true preference.

FIG. 2 will be referred back to. The display controller 30 is a processor that executes display of a screen to the user using the web screen and acceptance of various operations performed by the user via the web screen. Specifically, the display controller 30 displays various lists that are generated by the preference estimator 21 and items that are searched for according to a preference that is input by the user, etc.

Figure 12:
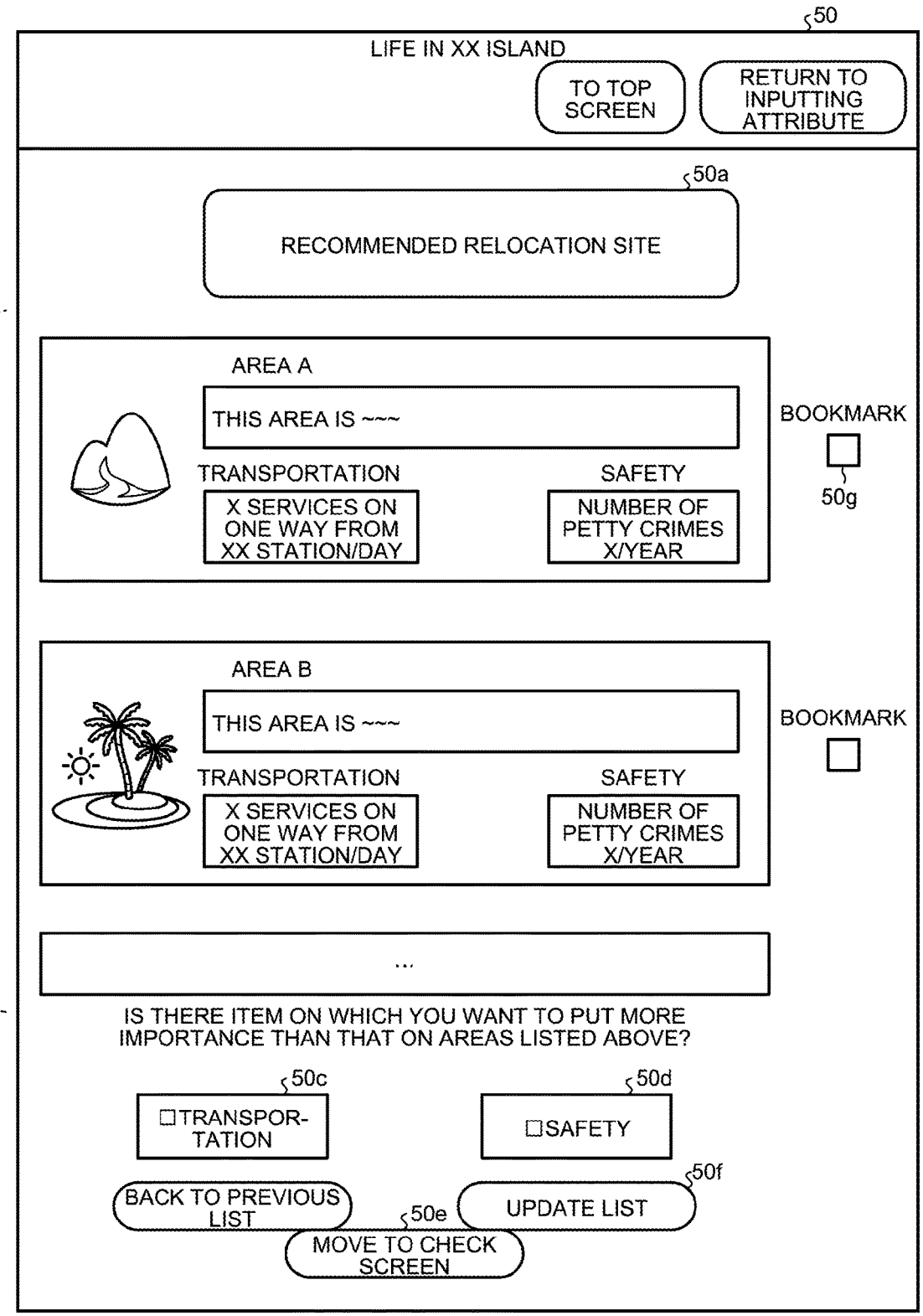
FIG. 12 is a diagram illustrating exemplary specific display of items.

FIG. 12 is a diagram illustrating exemplary specific display of items. An area 50a of a screen 50 illustrated in FIG. 12 is an area to display the title of the web screen and display an attribute that is chosen by the user or an item on which the user places importance. An area 50b is an area on which a list of local governments that match the user is displayed, that is, an area on which a top-N list of items is displayed. A button 50c and a button 50d are buttons to accept choice of an item on which importance is placed, and the button 50c is chosen to place importance on transportation convenience and the button 50d is chosen to place importance on safety. A button 50e is a button to move to a check screen and is pressed when a satisfactory local government is searched for. A button 50f is a button to request updating the list. A button 50g is a button for addition to the bookmark and is a button for temporarily storing information for the user to use the information to compare and weigh a relocation site.

For example, when "safety low" or the like is chosen as the preference attribute group list, the display controller 30 displays the list of items corresponding to "safety low" in the area 50b. When the button 50f is pressed with safety being chosen, this means that the preference acceptor 22 accepts the preference "safety +".

Process Flow

Figure 13:
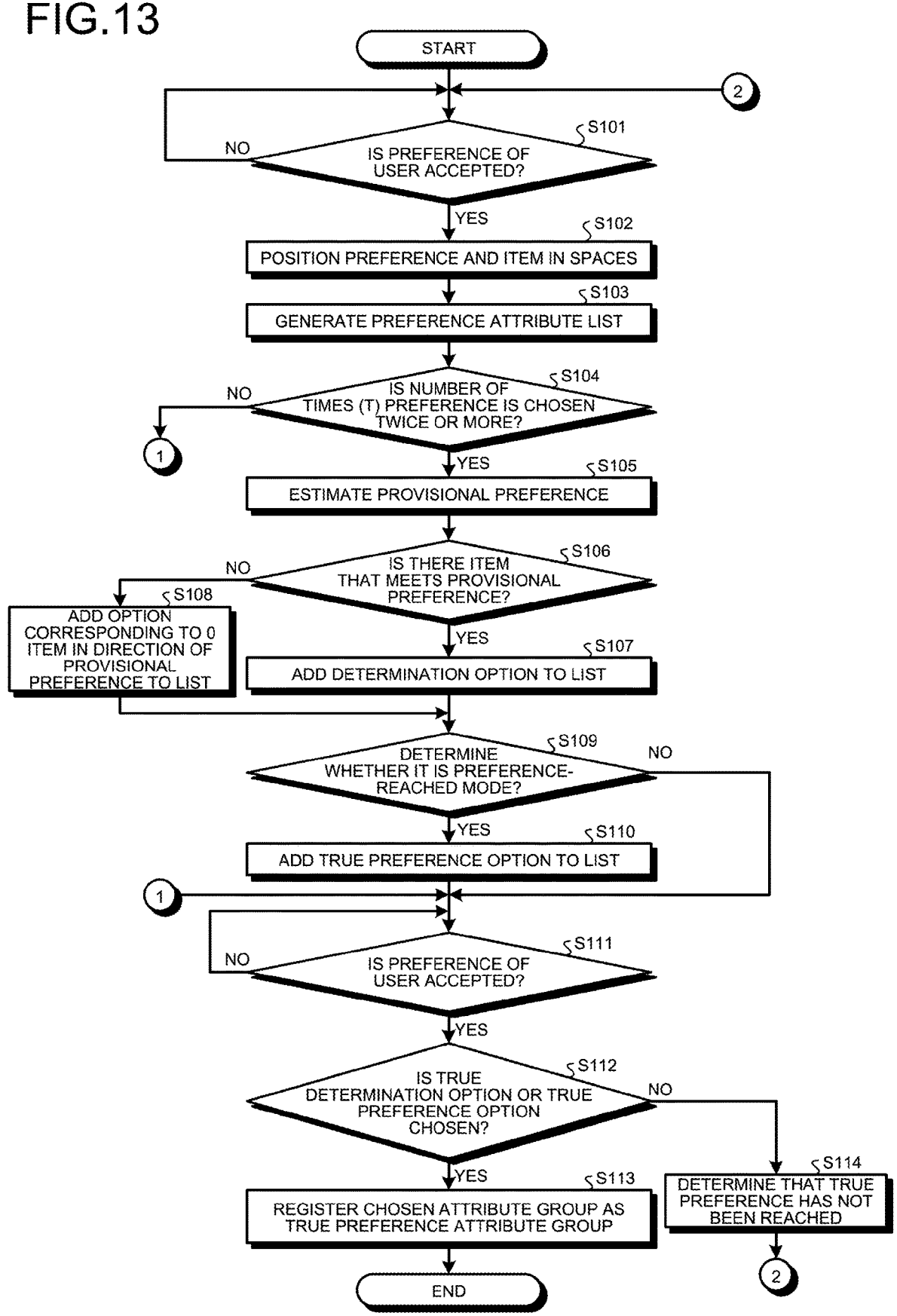
FIG. 13 is a flowchart illustrating a flow of a process.

FIG. 13 is a flowchart illustrating a process flow. A process that is executed by the preference estimator 21 will be described here. The display controller 30 executes display of a screen properly according to timing of display of a list performed by the preference estimator 21.

As illustrated in FIG. 13, when a preference of the user is accepted by the preference acceptor 22 (YES at S101), the space arranger 23 positions the preference of the user in a preference space and positions items corresponding to the preference of the user in an item space (S102).

The list generator 24 then generates a list of preference attribute groups (S103) and the provisional preference estimator 25 determines whether the number of times a preference is chosen (the number of times of choice) is twice or more (S104). When the number of time of choice is twice or more and there is a log of preferences in the past (YES at S104), the provisional preference estimator 25 estimates a provisional preference using the log of preferences in the past (S105). At S104, when the number of times a preference is chosen is less than twice (NO at S104), S111 and the following steps are executed.

The option adder 26 then determines whether there is an item that meets the "provisional preference" that is estimated by the provisional preference estimator 25 (S106). When there is a corresponding item (YES at S106), the option adder 26 adds a "determination option" for determining whether the "provisional preference" is a "true preference" to the preference attribute group list (S107). On the other hand, when there is no corresponding item (NO at S106), the option adder 26 adds a "determination option" corresponding to 0 item to the preference attribute group list (S108).

Thereafter, when it is determined that the user has reached the preference-reached mode that is the mode where the user has reached a true preference (YES at S109), the determination unit 27 adds a "true preference option" to the preference attribute group list (S110). On the other hand, when it is not determined that the preference-reached mode has been reached (NO at S109), the determination unit 27 executes S111 without executing S110.

When a choice of the user is accepted on the preference attribute group list (YES at S111), the determination unit 27 determines whether the chosen attribute group is the "determination option" or the "true preference option" (S112).

When the "determination option" or the "true preference option" is chosen (YES at S112), the determination unit 27 registers the chosen attribute group as the true preference attribute group (S113). The determination unit 27 may display a message to end the process, or the like. On the other hand, when an option other than the "determination option" and the "true preference option" is chosen (NO at S112), the determination unit 27 determines that the true preference has not been reached (S114) and S101 and the following steps are executed for a new preference.

Effect

As described above, the search device 10 determines whether the user has reached a true preference based on the user's choice of the "determination option", which is created based on the preference log of the user. In order for the user who has reached the true preference to end the "convincing process" early, for example, the search device 10 represents information indicating that there is no better item in the direction in which the user is directed.

As a result, the search device 10 omits or shortens the convincing process, thereby inhibiting the user from deviating largely from the true preference. The search device 10 determines whether the user is in the convincing process by representing the "determination option" based on the log of choices of the user and determining whether the true preference is reached based on the choice. Furthermore, the search device 10 separately uses methods of representing information to a user who has reached a true preference and a user who has not reached a true preference, thereby suggesting to the having-reached user that the user should separate from the system before the convincing process prolongs and representing information to suggest to the not-having-reached user that the user should input a new preference.

Figure 14:
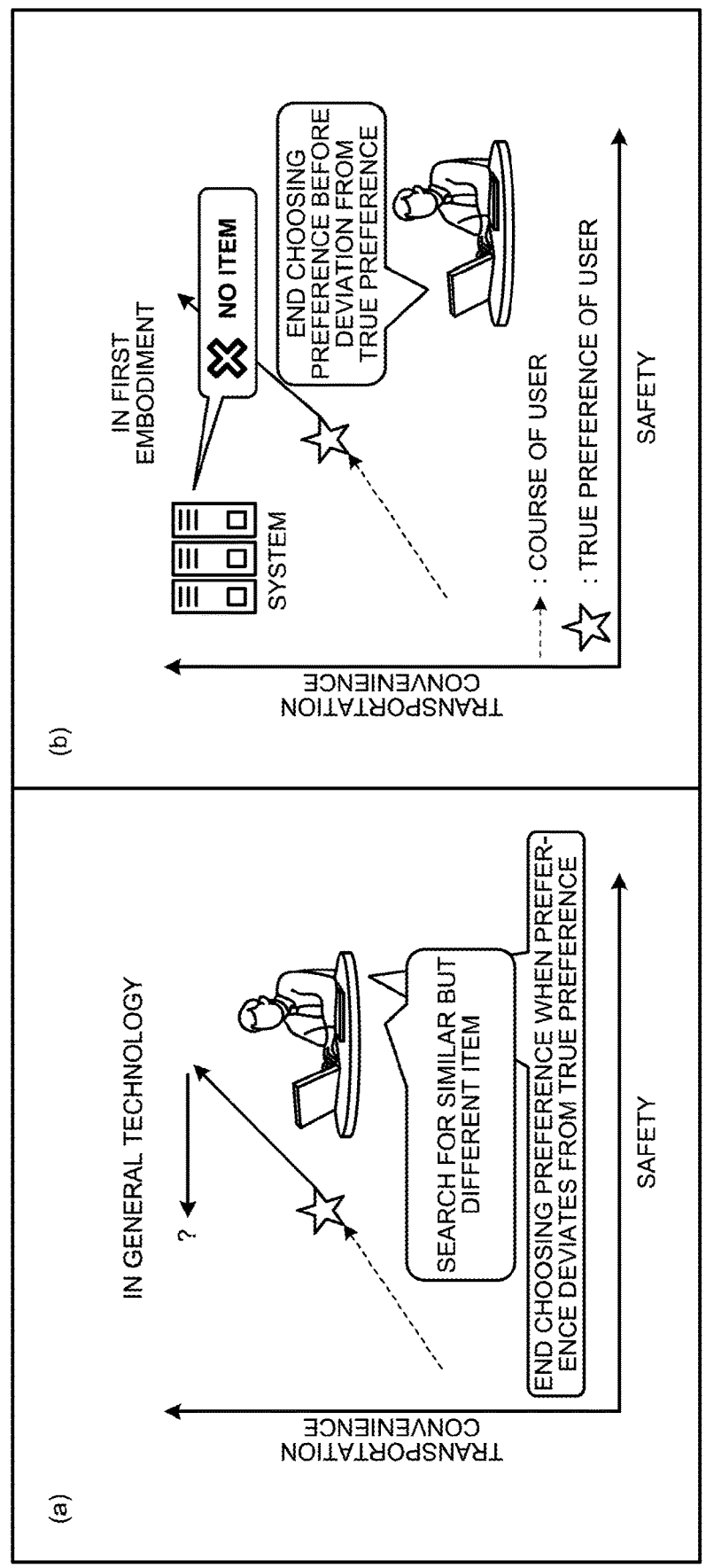
FIG. 14 is a diagram illustrating an effect of the first embodiment.

FIG. 14 is a diagram illustrating an effect of the first embodiment. As illustrated in (a) in FIG. 14, in a general technology, information representation is not implemented in consideration of the convincing process. In other words, the user does not notice that the user has reached a true preference and continues searching for similar but different items and then is tired of searching because it takes too much time and deviates largely from the true preference and ends specifying a preference.

Figure 15:
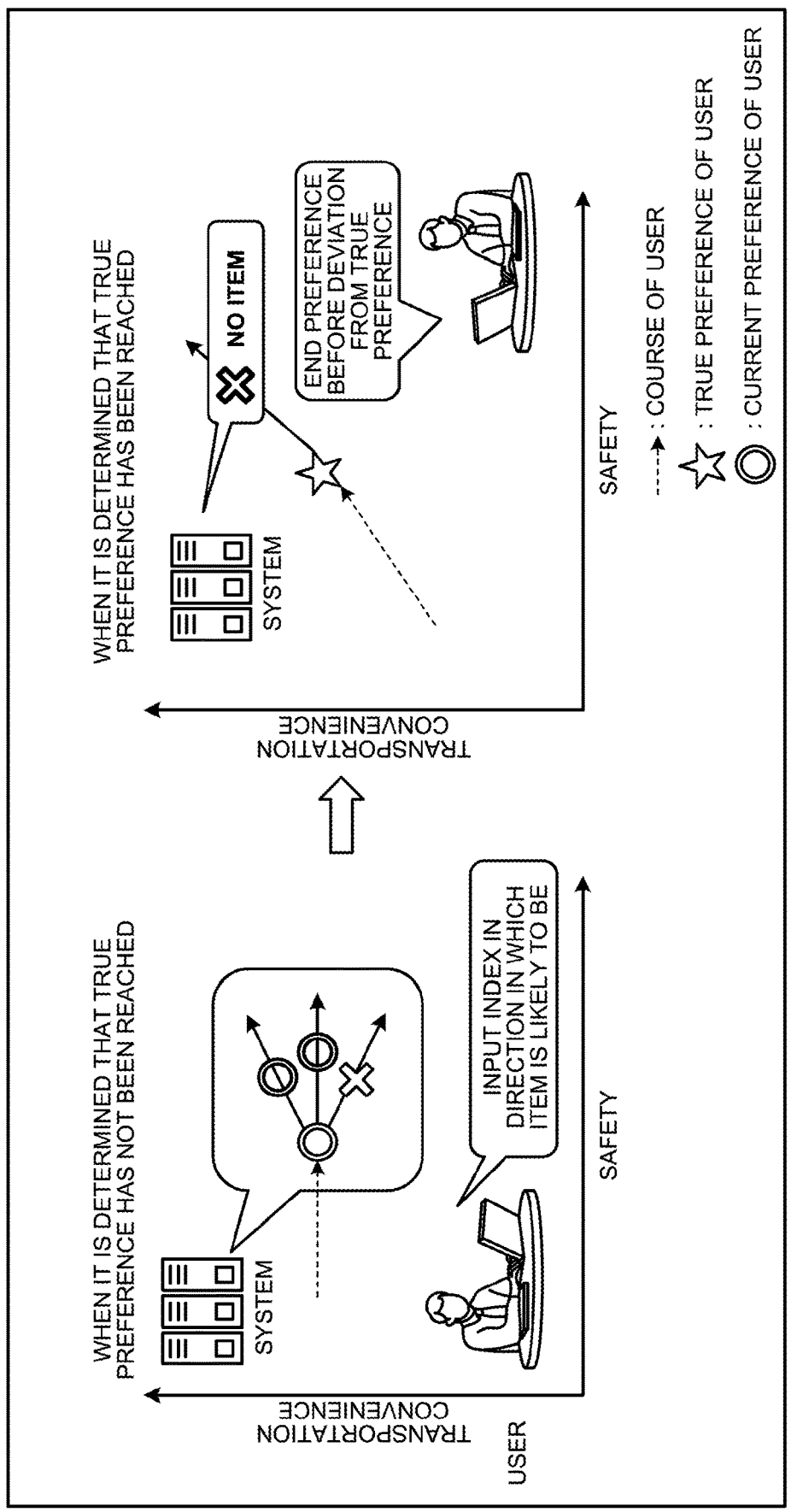
FIG. 15 is a diagram illustrating an effect caused because a true preference can be determined.
Figure 16:
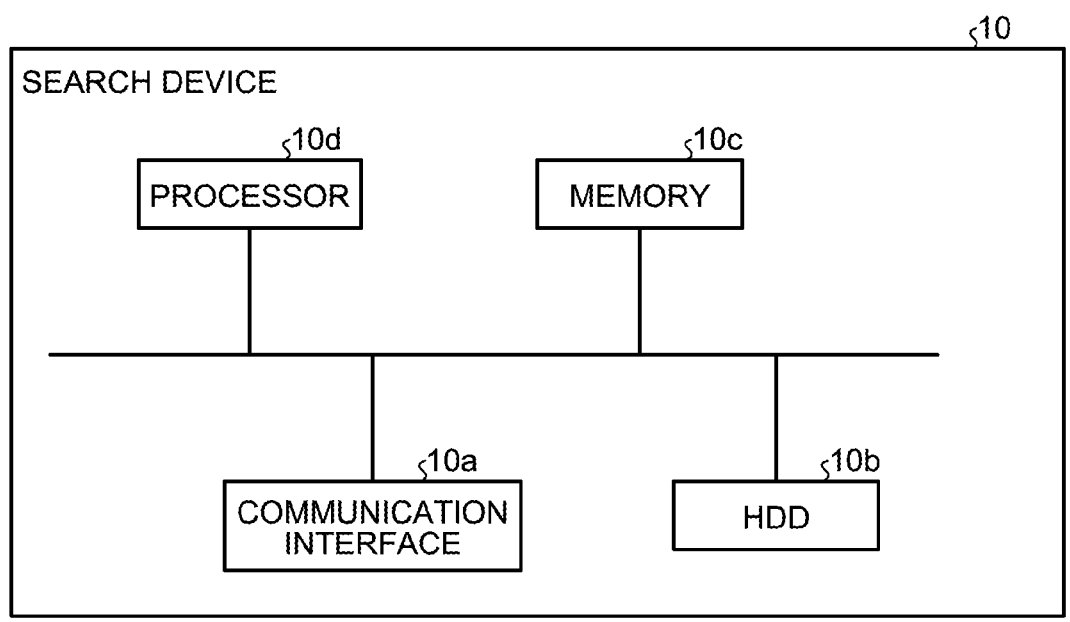
FIG. 16 is a diagram illustrating an exemplary hardware configuration.

On the other hand, as illustrated in (b) in FIG. 14, the search device 10 according to the first embodiment is able to determine whether the user is in the convincing process and gives a display indicating whether there is an item in the direction that the user is likely to prefer. In other words, the user is able to notice that the user has reached the true preference and the user can be inhibited from executing searching deviating largely from the true preference. FIG. 15 is a diagram illustrating an effect caused because a true preference can be determined. As illustrated in FIG. 15, as the search device 10 is able to represent an attribute group in a direction in which an item is to the user who is determined as having not reached the true preference, the user is able to input an index (preference) in a direction in which an item is likely to be. The search device 10 is able to suggest to the user who is determined as having reached the true preference that the user should end specifying a preference before deviating largely from the true preference.

[b] Second Embodiment

The embodiment of the present invention has been described. The invention may be carried out in various different modes in addition to the above-described embodiment.

Item on which Importance is Placed (Preference Item)

The first embodiment has been described by exemplifying mapping onto the space of two dimensions that are transportation convenience and safety; however, embodiments are not limited thereto. Transportation convenience, shopping, school, ties with neighbors, hospital and safety represented in FIG. 3, etc., may be combined optionally and used. For example, when all of them are used, an inquiry is made about any of the six items as an item on which importance is placed, the item is mapped onto a six-dimensional space, and the above-described process is executed.

Segmentation

For the above-described segmentation method, known various segmentation methods may be used. For example, the final preference results of other users are grouped to generate multiple groups and determines to which one of the groups an initial value input by the user belongs. The average of the group to which the initial value belongs can be used as an initial preference and can be mapped onto a preference space.

Item

In the first embodiment, the example where an item that is represented using the concentric circle in the two-dimensional virtual space is chosen has been described; however, embodiments are not limited thereto. For example, a known linear calculation method may be used. In the first embodiment, the example where the top-3 list is displayed has been described; however, it may be changed to the top fours, or the like, and set optionally.

Weight Value

The above-described exemplary setting of weight values is an example only and the setting may be changed optionally. Furthermore, it is also possible to set a value by simple increase such that the weight on a new preference is the largest or set a value regularly. In the first embodiment, the example where a preference with a score equal to or larger than the threshold (0.5) is chosen has been described; however, embodiments are not limited thereto. For example, a preference with the highest score may be chosen.

Exemplary Preference

In the first embodiment, "+ (plus)" and "– (minus)" are used as an exemplary notation of preferences of the user to denote attributes (preferences) on which importance is placed, etc. They are however an example only and embodiments are not limited thereto. When the user specifies "+" in a state where items with respect to each area (see FIG. 3) are set as numeric values, for example, an increase by a given value, such as 1, may be made. Specifically, when "safety +" is chosen in a state where "transportation convenience=2 and safety=1" are chosen as a preference of the user, the preference of the user changes to "transportation convenience=2 and safety=2".

When the user specifies "safety +" in a state where each item is listed in specific examples like those in FIG. 3 and "safety=10 (cases)/year" is chosen as the current preference, areas for which "9 (cases)/year" or lower is set correspond.

Convincing Process

When the user does not choose the determination option or the true preference option after reaching the above-described convincing process, it is possible to, while changing attribute groups in the list by the above-described method, continuously display the determination option and the true preference option. It is also possible to inhibit the attribute groups of the list from changing and subsequently display the determination option and the true preference option.

The search device 10 is able to display the determination option that is created based on the preference log of the user and other options to the user who has not reached the true preference. When there is 0 item in the preferred direction, the direction is not displayed as much as possible. When the determination option is contained in only the direction with 0 item, the direction is displayed.

Hardware

Figure 17:
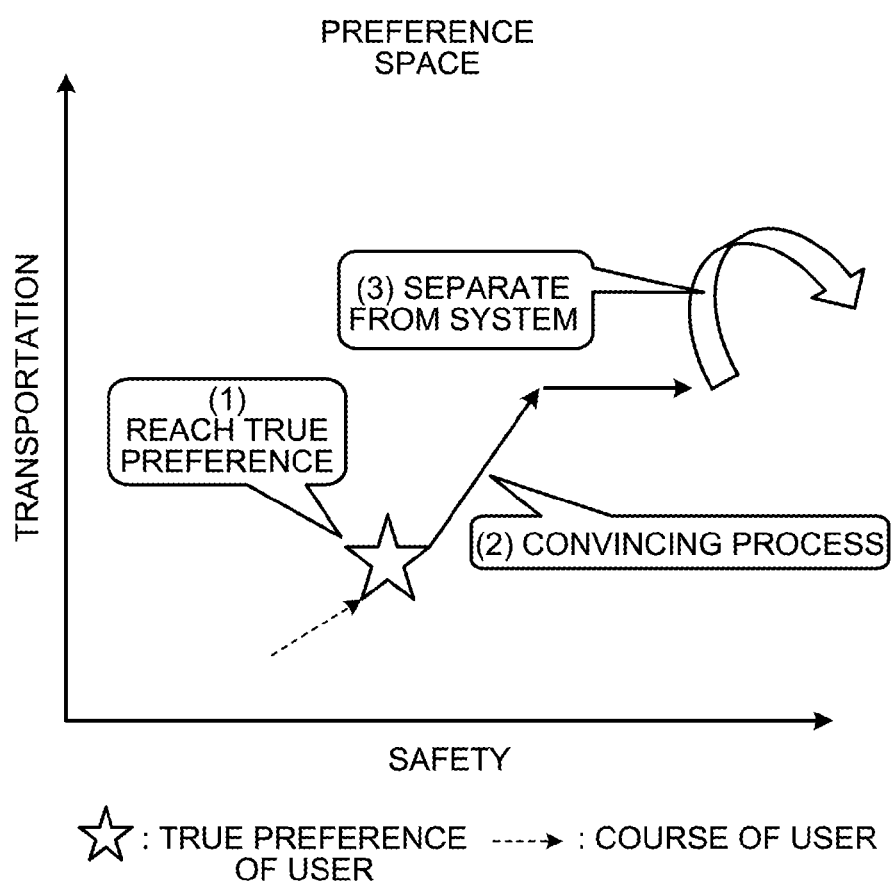
FIG. 17 is a diagram illustrating a convincing process.

FIG. 17 is a diagram illustrating an exemplary hardware configuration. As illustrated in FIG. 17, the search device 10 includes a communication interface 10a, a hard disk drive (HDD) 10b, a memory 10c, and a processor 10d. The units illustrated in FIG. 17 are connected mutually via a bus, etc.

The communication interface 10a is a network interface card, or the like, and communicates with other servers. The HDD 10b stores programs to implement the functions represented in FIG. 2 and a DB.

The processor 10d reads a program to execute the same processes as those of the respective processors represented in FIG. 2 and loads the program into the memory 10c to run processes to implement the respective functions illustrated with reference to FIG. 2, etc. In other words, the processes implement the same functions as those of the processors of the search device 10. Specifically, the processor 10d reads a program with the same functions as those of the preference estimator 21, the display controller 30, etc., from the HDD 10b, or the like. The processor 10d then executes processes to execute the same processes as those of the preference estimator 21, the display controller 30, etc.

As described above, the search device 10 operates as an information processing device that executes an estimation method by reading and executing the program. The search device 10 may read the above-described program from a recording medium using a medium read device and execute the read program to implement the same functions as those of the above-described embodiment. Programs in other embodiments are not limited to ones that are executed by the search device 10. For example, the present invention may apply also to a case where another computer or another server executes the program or another computer and another server may cooperate to execute the program.

System

The process procedure, control procedure, specific names, information containing various types of data and parameters may be changed optionally unless otherwise noted.

Each component of each device illustrated in the drawings is a functional idea and thus is not always be configured physically as illustrated in the drawings. In other words, specific modes of distribution or integration in each device are not limited to those illustrated in the drawings. In other words, all or part of the components may be configured by being distributed or integrated functionally or physically according to a given unit in accordance with various types of load and usage. For example, the processor that displays items and the processor that estimates a preference may be implemented with different chassis. Furthermore, all or any part of the processing functions that are implemented in the respective devices may be implemented by a CPU and a program that is analyzed and executed by the CPU or may be implemented as hardware using a wired logic.

According to the embodiments, it is possible to inhibit deterioration in accuracy of estimating a preference of a user.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored a relocator matching program that causes a computer to execute a process comprising:
    displaying, on a web screen of the computer, a plurality of inquiries to a respondent to collect answers corresponding the plurality of inquiries from the respondent;
    for each inquiry of the plurality of inquiries including a plurality of options that matches what a relocator wants, based on a number of times a preference chosen and a log of answers of the respondent in past, specifying a matching option indicating a trend of choosing an option corresponding to answers of the respondent from the plurality of options to be represented to the respondent;
    when an answer to the plurality of options is included in the matching option, determining that the respondent reaches a preference-reached mode that is a mode where a true preference is reached and where estimating a preference of each user performed by a search device converges, wherein the matching option includes attribute groups and number of items;
    in response to a result of the determining that the respondent reaches the preference-reached mode, transmitting, to the respondent, an inquiry including options included in the matching option, wherein contents of the options included in the inquiry being changed depend on whether the respondent reaches the preference-reached mode in the determining;
    in response to a result of determining that the respondent does not reach the preference-reached mode, counting a number of items positioned in a position relative to a latest answer and representing, to the respondent, on the web screen an inquiry including the counted number of items that are updated based on the latest answer; and
    when no option included in the matching option is chosen by the respondent after when the determining that the respondent reaches the preference-reached mode, keeping representing options included in the matching option until an option included in the matching option is chosen.

2. The non-transitory computer-readable recording medium according to claim 1, wherein the process further comprises, when the determining determines that the respondent reaches the preference-reached mode, representing an inquiry including an option included in the matching option.

3. The non-transitory computer-readable recording medium according to claim 2, wherein the process further comprises, when the determining determines that the respondent reaches the preference-reached mode, representing, to the respondent, number of items that are specified by an option included in the matching option among items that are represented to the respondent and are specified by the options, respectively.

4. The non-transitory computer-readable recording medium according to claim 1, wherein the process further comprises, when displaying inquiries to the respondent, when a log of a given number of answers of the respondent or larger is not recorded, displaying the inquiries to collect answers and, when a log of the given number of answers of the respondent or larger is recorded, specifying the matching option.

5. A relocator matching method executed by a computer, the relocator matching method comprising:
    displaying, by the computer on a web screen of the computer, a plurality of inquiries to a respondent to collect answers corresponding the plurality of inquiries from the respondent;
    for each inquiry of the plurality of inquiries including a plurality of options that matches what a relocator wants, based on a number of times a preference chosen and a log of answers of the respondent in past, specifying, by the computer, a matching option indicating a trend of choosing an option corresponding to answers of the respondent from the plurality of options to be represented to the respondent;
    when an answer to the plurality of options is included in the matching option, determining, by the computer, that the respondent reaches a preference-reached mode that is a mode where a true preference is reached and where estimating a preference of each user performed by a search device converges, wherein the matching option includes attribute groups and number of items; and
    in response to a result of the determining that the respondent reaches the preference-reached mode, transmitting, by the computer to the respondent, an inquiry including options included in the matching option, wherein contents of the options included in the inquiry being changed depend on whether the respondent reaches the preference-reached mode in the determining;
    in response to a result of a determining that the respondent does not reach the preference-reached mode, counting, by the computer, a number of items positioned in a position relative to a latest answer and representing, to the respondent, on the web screen an inquiry including the counted number items that are updated based on the latest answer; and when no option included in the matching option is chosen by the respondent after when the determining that the respondent reaches the preference-reached mode, keeping, by the computer, representing options included in the matching option until an option included in the matching option is chosen.

6. A relocator matching device comprising:

a memory; and a processor coupled to the memory and the processor configured to:

display, on a web screen of a computer, a plurality of inquiries to a respondent to collect answers corresponding the plurality of inquiries from the respondent;

for each inquiry of the plurality of inquiries including a plurality of options that matches what a relocator wants, based on a number of times a preference chosen and a log of answers of the respondent in past, specifying a matching option indicating a trend of choosing an option corresponding to answers of the respondent from the plurality of options to be represented to the respondent;

when an answer to the plurality of options is included in the matching option, determine that the respondent reaches a preference-reached mode that is a mode where a true preference is reached and where estimating a preference of each user performed by a search device converges, wherein the matching option includes attribute groups and number of items;

in response to a result of the determining that the respondent reaches the preference-reached mode, transmit, to the respondent, an inquiry including options included in the matching option, wherein contents of the options included in the inquiry being changed depend on whether the respondent reaches the preference-reached mode in the determining;

in response to a result of determining that the respondent does not reach the preference-reached mode, counting a number of items positioned in a position relative to a latest answer and representing, to the respondent, on the web screen an inquiry including the counted number items that are updated based on the latest answer; and when no option included in the matching option is chosen by the respondent after when the determining that the respondent reaches the preference-reached mode, keeping representing options included in the matching option until an option included in the matching option is chosen.

\* \* \* \* \*